United States Patent Office 3,406,013
Patented Oct. 15, 1968

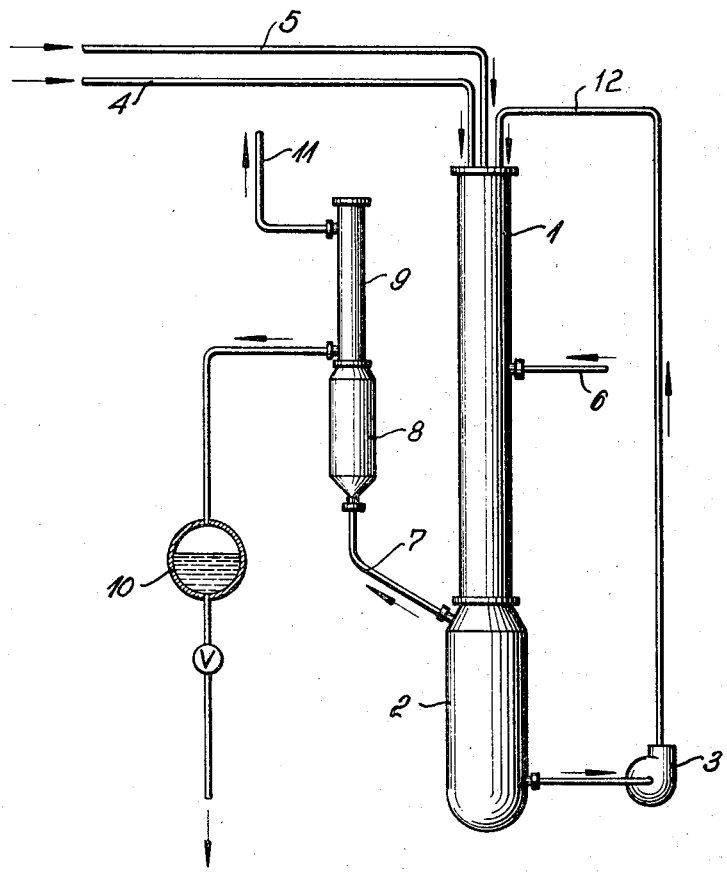

3,406,013
PROCESS FOR THE MANUFACTURE OF A PHOSPHORUS OXYCHLORIDE
Günther Müller-Schiedmayer, Knapsack, near Cologne, Heinz Harnisch, Lovenich, near Cologne, and Joseph Cremer, Hermulheim, near Cologne, Germany, assignors to Knapsack Aktiengesellschaft, Cologne, Germany, a corporation of Germany
Filed June 17, 1963, Ser. No. 288,086
Claims priority, application Germany, July 12, 1962, K 47,214
1 Claim. (Cl. 23—203)

ABSTRACT OF THE DISCLOSURE $POCl_3$ and higher phosphorus oxychlorides are prepared by mixing liquid phosphorus, gaseous oxygen and gaseous chlorine with liquid $POCl_3$ to cause the P, $O_2$ and $Cl_2$ to react without flame formation. The heat of the reaction is used to boil off $POCl_3$ which is condensed and recovered.

---

The present invention relates to a process for the manufacture of phosphorus oxychloride and/or higher phosphorus-chlorine-oxygen compounds of the general formula: $P_nO_{2n-1}Cl_{n+2}$ from the elements yellow phosphorus, chlorine and oxygen in the absence of phosphorus trichloride being formed as an intermediary product, and it also relates to an apparatus for carrying out this process.

It is known that phosphorus oxychloride can be prepared by various ways represented by the following reaction equations:

(1)  $PCl_3 + Cl_2 + H_2O \rightarrow POCl_3 + 2HCl$
(2)  $3PCl_3 + 3Cl_2 + P_2O_5 \rightarrow 5POCl_3$
(3)  $P_2O_5 + 3COCl_2 \rightarrow 2POCl_3 + 3CO_2$ These processes are not satisfactory from an economical and technical point of view and, therefore, they are not carried out in industry.

The direct oxidation of phosphorus trichloride with oxygen according to the equation:

(4)  $PCl_3 + 1/2 O_2 \rightarrow POCl_3$ is the industrial process most economic up to date, which is carried out in the presence or absence of a catalyst (cf. Patents Nos. 945,753 and 1,091,548 granted in the Federal Republic of Germany and Patent No. 21,544 granted in the so-called German Democratic Republic). This process is carried out in a manner analogous to the discontinuous (stepwise) oxidation of phosphorus trichloride with oxygen within 60 to 80 hours at a temperature of 50 to 60° C. described in the BIOS Final Report No. 562 entitled: "The German Phosphorus Industry at Bitterfeld and Piesteritz."

The processes customarily used for oxidizing phosphorus trichloride are associated with a series of disadvantages. The way via phosphorus trichloride as an intermediate stage requires a correspondingly great capacity for phosphorus trichloride production. Furthermore, phosphorus trichloride reacts with oxygen at a low velocity which often is even further reduced by oxidation inhibitors contained in phosphorus trichloride. The space/time yield obtained by the oxidation reaction is small and, moreover, subject to variation due to the reaction velocity being reduced as the oxidation of $PCl_3$ increases. Still further, is the case where the degree of oxygen utilization is subject to variation, considerable amounts of off-gas (vented gas) are lost, even if the off-gases are cooled, the losses being due to the high partial pressure of the phosphorus halides.

German Patent No. 801,513 describes a still further process for making phosphorus oxychloride, wherein phosphorus, oxygen and chlorine are allowed to react with one another with flame formation and the resulting hot vapors are condensed.

Processes for making higher phosphorus oxychlorides have already been proposed. Thus, for example, it has been proposed to make pyrophosphoryl chloride by reacting phosphorus oxychloride with phosphorus pentoxide in a bomb tube (cf. H. Grunze, Z. anorg. allgem. Chemie 296, (1958), 63) or by partially hydrolyzing phosphorus oxychloride (cf. M. Becke and I. Sambeth, Angew. Chemie 69 (1957), 640) or by condensing dichlorophosphoric acid with phosphorus oxychloride (cf. German Patent No. 1,098,495) according to the equation:

(5)  $P(O)Cl_2OH + POCl_3 \rightarrow P_2O_3Cl_4 + HCl$

In other words, pyrophosphoryl chloride has previously been prepared exclusively via the indirect phosphorus oxychloride stage.

None of the above processes is, however, satisfactory due to the poor yields and the undesirable by-products obtained, for example hydrochloric acid from condensation reactions.

The present invention now provides a process for the manufacture of phosphorus oxychloride and/or higher phosphorus oxychlorides, for example pyrophosphoryl chloride, wherein yellow phosphorus at least partially dissolved in a liquid medium is directly reacted with a mixture of chlorine and oxygen resulting in the formation of the above-mentioned final products, the reaction being carried out in the manner shown by the following equations:

(6)  $P_{yellow} + 3/2 Cl_2 + 1/2 O_2 \rightarrow POCl_3$
(7)  $P_{yellow} + 2Cl_2 + 3/2 O_2 \rightarrow P_2O_3Cl_4$ i.e. according to the general equation (8)  $nP + \dfrac{n+2}{2}Cl_2 + \dfrac{2n-1}{2}O_2 \longrightarrow P_nO_{2n-1}Cl_{n+2}$ Equations 6 and 7 correspond to Equation 8 when $n$ is 1 and 2, respectively.

As compared with the processes known for the manufacture of phosphorus oxychloride and pyrophosphoryl chloride, the process of the present invention offers various advantages. The phosphorus chlorides can be directly in one reaction stage from yellow phosphorus without any plant for the preparation of preliminary products being required and in the absence of undesirable by-products being formed. The space/time yield as opposed to that obtained by the oxidation of phosphorus trichloride with oxygen is substantially increased for the reason that the velocity-determining reaction step of the phosphorus oxychloride synthesis, i.e. the oxidation with oxygen, is the rapid direct reaction between elementary phosphorus and oxygen. The total reaction can be assumed to take place in two partial steps as shown by the following equation:

(9)  $P_{yellow} + 1/2 O_2 \longrightarrow [PO]$
$\underline{[PO] + 3/2 Cl_2 \longrightarrow POCl_3}$
$P_{yellow} + 3/2 Cl_2 + 1/2 O_2 \longrightarrow POCl_3$ the phosphorus oxides or mixed oxides oxidized to a lower stage reacting likewise rapidly with the chlorine.

The reaction of yellow phosphorus with chlorine and oxygen is carried out in the presence of a liquid medium in which phosphorus is at least partially soluble and the boiling point of which is equal to or higher than that of phosphorus oxychloride. Phosphorus oxychloride or a mixture of phosphorus oxychloride with pyrophosphoryl chloride and higher-condensed phosphorus oxychlorides is preferably used as the liquid medium in which the phosphorus is soluble and in which it is present in such a proportion that the ratio by weight of the phosphorus to solvent is preferably greater than 1:20.

The mixture of gaseous chlorine and gaseous oxygen is contacted in the state of fairly fine distribution with the liquid medium containing phosphorus in which the chlorine may be soluble.

The phosphorus may be used in excess, but it is advantageous to carry out the process in a manner such that the proportion of phosphorus supplied per unit of time to the reaction zone corresponds to the proportion contained in the gaseous reaction products withdrawn from that zone.

The reaction takes place at a temperature of 50 to 140° C., preferably at that temperature which corresponds to the boiling point of the resulting solution. This boiling temperature depends on the composition of the liquid phase consisting of phosphorus oxychloride, pyrophosphoryl chloride, and higher-condensed phosphorus oxychlorides, and is preferably situated at 107 to 125° C.

As already mentioned above, the process of the present invention enables phosphorus oxychloride to be prepared alone or in addition to pyrophosphoryl chloride. The ratio in which phosphorus oxychloride and pyrophosphoryl chloride are formed is determined by the ratio of chlorine to oxygen.

When phosphorus oxychloride is prepared alone in continuous manner, the proportion of chlorine used as indicated in Equation 6 above corresponds stoichiometrically to the proportion of phosphorus supplied per unit of time. The lower limit for the proportion of oxygen likewise corresponds to stoichiometric conditions, but the oxygen is advantageously used in an excess of 10 to 20% over that stoichiometrical amount.

The phosphorus oxychloride formed is separated from the reaction solution in continuous or discontinuous manner by distillation. The distillation is preferably carried out continuously, the reaction heat evolved being removed as the heat of evaporation.

Higher phosphorus oxychlorides are obtained in addition to phosphorus oxychlorides by shifting the chlorine to oxygen ratio, that is to say the proportion of chlorine is reduced and the proportion of oxygen increased. The proportion of chlorine supplied per unit of time should be less than the stoichiometrical proportion referred to the formation of phosphorus oxychloride. In order to obtain a maximum yield of higher phosphorus oxychlorides, the reaction is advantageously carried out in such a manner that the proportion of chlorine indicated in Equation 7 above corresponds to the stoichiometrical proportion and that the proportion of oxygen used corresponds to an excess of about 10 to 20% over that stoichiometrical proportion. A proportion of chlorine smaller than here indicated favors the formation of phosphorus oxychlorides condensed to a higher stage.

Phosphorus oxychlorides condensed to a higher stage can always be transformed into phosphorus oxychloride or pyrophosphoryl chloride by increasing the ratio of chlorine to phosphorus beyond the ratio of 3:1.

The higher phosphorus oxychlorides are advantageously separated from the reaction mixture in a second stage under reduced pressure. Thus, for example, pyrophosphoryl chloride is obtained by distillation under a pressure of preferably about 5 to 200 mm. mercury.

The yellow phosphorus can be reacted with the chlorine/oxygen mixture in continuous or discontinuous manner in a stirring vessel, into which the total amount of phosphorus may be first introduced and the chlorine/oxygen mixture then added, or into which the starting components may be introduced in corresponding proportions.

The process of the present invention is carried out in continuous manner while using the reaction heat for distilling the reaction products by passing the circulated liquid phase and the starting substances phosphorus, oxygen and chlorine through an appropriate, for example channel-shaped reactor which is long as related to its diameter, the reactor being dimensioned and the velocity of the substances flowing through the reactor being selected so that the dwell of these substances in the reactor is greater than the time during which the dissolved phosphorus undergoes reaction with the oxygen and the chlorine. The starting mixture has then completely reacted in the manner desired on leaving the reactor.

An apparatus suitable for use in carrying out the process of the present invention in continuous manner is shown diagrammatically in the accompanying drawing.

Referring to the drawing:

Bottom product collecting in distilling vessel 2 is cycled by means of circulating pump 3 through the vapor space in reactor column 1 which is charged with filling material and connected to vessel 2. Column 1 is provided with a cooling jacket (not shown in the drawing) which serves to dissipate a part of the reaction heat evolved. Liquid phosphorus is supplied in measured quantities to the top portion of column 1 through line 4 and distributed in the liquid medium, such as $POCl_3$ serving as a solvent. Oxygen and chlorine are introduced concurrently in the state of fine distribution or in the order of succession indicated above, preferably into the top portion of the column through line 5 co-current with the solvent. The oxygen and chlorine supply inlets should preferably be disposed in the vicinity of the supply inlet 12 for the liquid medium. All the chlorine and oxygen may be introduced into the top portion of the column; alternatively, a portion of the chlorine may be introduced into the center portion 6 of column 1. The reaction product formed is distilled off through gas outlet opening 7 near the bottom of the vapor space in the reactor, passed through a small wash column 8 and ultimately condensed in cooler 9. A portion of the condensed matter is removed from cooler 9 and introduced into collecting vessel 10, the remaining condensed matter being returned as the reflux to vessel 2. Oxygen in excess escapes through off-gas line 11.

The reaction is preferably carried out under pressures greater than the vapor pressure of the liquid phase at the corresponding reaction temperature, and the liquid phase is expanded on issuing into the atmosphere.

The following examples serve to illustrate the invention, but they are not intended to limit it thereto:

Example 1

3,550 grams chlorine and 1.25 cubic meters oxygen (measured at N.T.P.) were introduced concurrently at a temperature of 85 to 90° C. into a mixture of 3,100 grams crude, yellow phosphorus and 15 kg. phosphorus oxychloride. $OPCl_3$ was obtained in a yield of 15,200 grams corresponding to 99.2%, calculated on the phosphorus used.

Example 2

3,550 grams chlorine and 2.2 cubic meters oxygen (measured at N.T.P.) were introduced at a temperature of 90 to 95° C. into a mixture of 3,100 grams crude, yellow phosphorus and 15 kg. phosphorus oxychloride. $P_2O_3Cl_4$ was obtained in a yield of 530 grams corresponding to 40.5%, calculated on the phosphorus used.

Example 3

3,100 grams per hour crude, yellow phosphorus were introduced in the liquid state and in measured quantities into phosphorus oxychloride cycled through a column, and the column was charged concurrently therewith, with 3,550 grams chlorine per hour and 1.25 cubic meters oxygen per hour (measured at N.T.P.). Under dissipation of 13,800 Kcal./hr. reaction heat as the heat of evaporation, the reaction temperature was maintained at 107° C., 250 kg. $OPCl_3$ per hour were thereby evaporated.

$OPCl_3$ was obtained in a yield of 15.25 kg. per hour corresponding to 99.5%, calculated on the phosphorus used.

What is claimed is:

1. The process of manufacturing a phosphorus oxychloride which comprises reacting phosphorus with oxygen and chlorine in the presence of a phosphorus oxychloride by introducing into the vapor space of a reactor, co-current streams of liquid phosphorus, gaseous oxygen, gaseous chlorine, and a liquid phosphorus oxychloride, the proportion of the phosphorus oxychloride being such as to provide a liquid reaction medium, the reaction temperature being between 107 and 125° C., and distilling off the phosphorus oxychloride vaporized by the heat of the reaction.

References Cited

UNITED STATES PATENTS

| | | | |
|---|---|---|---|
| 1,888,713 | 11/1932 | Britton et al. | 23—203 X |
| 1,921,370 | 8/1933 | North | 23—203 |
| 3,052,520 | 9/1962 | Draeger et al. | 23—203 |

FOREIGN PATENTS 801,513  1/1951  Germany.

OTHER REFERENCES

Mellor.—"Comprehensive Treatise on Inorganic & Theoretical Chemistry," vol. 8, 1928, p. 999, pub. by Longmans, Green & Co., New York.

Gmelin-Kraut.—"Handbuch der Anorganischen Chemie," vol. 1, part 3, 1911, p. 324, Carl Winter's Universitatsbuchhandlung, Heidelberg, Germany.

OSCAR R. VERTIZ, *Primary Examiner.*

B. H. LEVENSON, *Assistant Examiner.*